United States Patent
Kim et al.

(10) Patent No.: US 12,157,345 B2
(45) Date of Patent: Dec. 3, 2024

(54) INTEGRATED THERMAL MANAGEMENT CIRCUIT FOR VEHICLE

(71) Applicants: Hyundai Motor Company, Seoul (KR); Kia Corporation, Seoul (KR)

(72) Inventors: Ki Mok Kim, Hwaseong-Si (KR); Man Ju Oh, Yongin-Si (KR); Sang Shin Lee, Suwon-Si (KR); Uk Il Yang, Yongin-Si (KR)

(73) Assignees: Hyundai Motor Corporation, Seoul (KR); Kia Corporation, Seoul (KR)

( * ) Notice: Subject to any disclaimer, the term of this patent is extended or adjusted under 35 U.S.C. 154(b) by 319 days.

(21) Appl. No.: 17/829,003

(22) Filed: May 31, 2022

(65) Prior Publication Data

US 2023/0035925 A1    Feb. 2, 2023

(30) Foreign Application Priority Data

Jul. 28, 2021 (KR) .................. 10-2021-0099298

(51) Int. Cl.
B60H 1/00     (2006.01)

(52) U.S. Cl.
CPC ..... B60H 1/00278 (2013.01); B60H 1/00271 (2013.01); B60H 1/00921 (2013.01); B60H 2001/00307 (2013.01); B60H 2001/00928 (2013.01); B60H 2001/00949 (2013.01)

(58) Field of Classification Search
CPC .................. B60H 1/00278; B60H 1/00921
See application file for complete search history.

(56) References Cited

U.S. PATENT DOCUMENTS

| 5,180,004 | A   | * | 1/1993  | Nguyen ............ B60H 1/3227 165/135 |
| 10,118,458 | B2 | * | 11/2018 | Kim .................. B60K 1/04 |
| 2012/0085114 | A1 | * | 4/2012  | Graaf ................ B60H 1/323 62/238.7 |
| 2016/0082805 | A1 | * | 3/2016  | Graaf ................ B60H 1/04 62/238.7 |
| 2017/0182867 | A1 | * | 6/2017  | Durrani ........... B60H 1/00342 |
| 2020/0189357 | A1 | * | 6/2020  | Chopard ......... B60H 1/00499 |
| 2020/0220236 | A1 | * | 7/2020  | Durrani ........... H01M 10/667 |
| 2020/0247212 | A1 | * | 8/2020  | Bara ................ B60H 1/32284 |

FOREIGN PATENT DOCUMENTS

KR    10-2019-0124032    11/2019

* cited by examiner

*Primary Examiner* — Eric S Ruppert
(74) *Attorney, Agent, or Firm* — Morgan, Lewis & Bockius LLP

(57) ABSTRACT

An integrated thermal management circuit for a vehicle is introduced, which includes a refrigerant line on which a refrigerant flows into the compressor; a battery cooling line making a cooling water circulate between a battery and a battery radiator or between the battery and the battery chiller; an electric cooling line making the cooling water circulate between an electronic driving unit and an electric radiator or between the electronic driving unit and the electric chiller; and a chiller control valve provided at an upstream point of the electric chiller and the battery chiller on the chiller line, and making the refrigerant discharged from the external heat exchanger flow into the electric chiller or the battery chiller.

18 Claims, 9 Drawing Sheets

INTEGRATED THERMAL MANAGEMENT CIRCUIT FOR VEHICLE

CROSS REFERENCE TO RELATED APPLICATION

The present application claims priority to Korean Patent Application No. 10-2021-0099298 filed on Jul. 28, 2021, the entire contents of which is incorporated herein for all purposes by this reference.

BACKGROUND OF THE PRESENT DISCLOSURE

Field of the Present Disclosure

The present disclosure relates to an integrated thermal management circuit for a vehicle, in which an electric chiller and a battery chiller are connected in parallel to each other to provide a chiller line, and heating through a heat pump and battery temperature rise are independently performed in accordance with a thermal management mode of a vehicle through a chiller control valve provided at a top end portion of the chiller line.

Description of Related Art

Recently, in conformity with the eco-friendly vehicle supply expansion policy and the high fuel efficiency vehicle preference, the number of registered domestic eco-friendly vehicles has been increased. An electric vehicle which is an eco-friendly vehicle is a vehicle which is driven using an electric battery and an electric motor without using a petroleum fuel and an engine. Because the electric vehicle has a system that drives the vehicle by rotating the motor with electricity accumulated in the battery, it has the advantage of no hazardous substance discharge, low noise, and high energy efficiency.

In case of a vehicle using the existing engine power, a vehicle heating system is operated using waste heat of the engine, whereas the electric vehicle does not have the engine, and thus is provided with a system that operates a heater using the electricity. Accordingly, the electric vehicle has the problem in that the driving distance is greatly reduced during heating.

Furthermore, a battery module may be used in an optimal temperature environment to maintain an optimum performance and long lifespan. However, it may be difficult to use the battery module in the optimal temperature environment due to the heat generated while driving and external temperature change.

To solve the problem, a scheme for organically combining an air conditioning system and a thermal management system of the electric vehicle has been actively discussed.

Meanwhile, in case of the conventional thermal management circuit that utilizes an integrated chiller exchanging heat with the electronic driving unit and the battery, a water heater has been used to heat the battery in a harsh environment. However, because the water heater is generally connected in series to the battery on a battery cooling water line together with the integrated chiller, and heats and supplies, to the battery, the cooling water that flows into the battery, there has been the problem in that in case of heating the battery through the water heater, it is not possible to recover the waste heat of the electronic driving unit through the integrated chiller and to utilize the waste heat for indoor heating of the vehicle, and thus the thermal management efficiency of the vehicle cannot but be degraded.

Accordingly, there is a demand for the development of an integrated thermal management circuit that can implement various driving modes for independently performing the indoor heating and the battery heating through the waste heat recovery of the electronic driving unit.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an integrated thermal management circuit fora vehicle, in which an electric chiller and a battery chiller are connected in parallel to each other to provide a chiller line, and heating through a heat pump and battery temperature rise are independently performed in accordance with a thermal management mode of a vehicle through a chiller control valve provided at a top end portion of the chiller line.

In one aspect of the present disclosure to achieve the above object, an integrated thermal management circuit for a vehicle according to an exemplary embodiment of the present disclosure includes: a refrigerant line on which a refrigerant flows in an order of a compressor, an indoor condenser of an indoor air conditioning device, and an external heat exchanger, the refrigerant discharged from the external heat exchanger is branched and flows into a chiller line and an evaporation line, an electric chiller and a battery chiller are connected in parallel on the chiller line, and the refrigerants having passed through the chiller line and the evaporation line join each other to flow into the compressor; a battery cooling line making a cooling water circulate between a battery and a battery radiator or between the battery and the battery chiller; an electric cooling line making the cooling water circulate between an electronic driving unit and an electric radiator or between the electronic driving unit and the electric chiller; and a chiller control valve provided at an upstream point of the electric chiller and the battery chiller on the chiller line, and making the refrigerant discharged from the external heat exchanger flow into the electric chiller or the battery chiller.

On the chiller line, the electric chiller and the battery chiller may be formed in unity, and a blocking partition wall blocking heat exchange may be provided between the electric chiller and the battery chiller.

The refrigerant of the refrigerant line, being heated by the battery chiller, the electric chiller, or the evaporator, may be compressed by the compressor, and may be cooled as sequentially passing through the indoor condenser and the external heat exchanger.

A water heater may be provided at a downstream point of the battery on the battery cooling line, and the cooling water having passed through the water heater on the battery cooling line may flow into the battery after passing through the battery radiator or the battery chiller.

The battery cooling line may operate the water heater in a battery heating mode, and the cooling water heated through the water heater may flow into the battery to heat the battery after passing through the battery chiller.

The chiller control valve may open or close an electric chiller side port or a battery chiller side port in accordance with a thermal management mode of the vehicle, and may block the battery chiller side port to prevent the refrigerant from flowing into the battery chiller in a battery heating mode.

A first control valve may be provided at a point where downstream of the battery radiator and the battery chiller and upstream of the battery join each other on the battery cooling line, and the first control valve may adjust a flow of the cooling water flowing into the battery by opening or closing a battery radiator side port or a battery chiller side port thereof in accordance with a thermal management mode of the battery.

The first control valve may be a three-way valve which blocks the battery chiller side port in an external air cooling mode of the battery, and may block the battery radiator side port in a chiller cooling mode or a heating mode of the battery.

A second control valve may be provided at a point where downstream of the electric radiator and the electric chiller and upstream of the electronic driving unit join each other on the electric cooling line, and the second control valve may adjust a flow of the cooling water flowing into the electronic driving unit by opening or closing an electric radiator side port or an electric chiller side port in accordance with a thermal management mode of the electronic driving unit.

The second control valve may be a three-way valve which blocks the electric chiller side port in an external air cooling mode of the electronic driving unit, and may block the electric radiator side port in an electric waste heat recovery mode of the electronic driving unit.

An expansion valve may be provided at an upstream point of the external heat exchanger, an upstream point of the chiller line, or an upstream point of the evaporation line on the refrigerant line, and the refrigerant passing through the expansion valve at the upstream point of the external heat exchanger, the upstream point of the chiller line, or the upstream point of the evaporation line may be selectively expanded in accordance with an air conditioning mode of the vehicle.

When the battery cooling line performs a battery heating mode, the electric cooling line may perform an electric waste heat recovery mode of the electronic driving unit, and the refrigerant line may perform indoor heating through waste heat of the electronic driving unit.

An expansion valve may be provided at an upstream point of the chiller control valve, and the refrigerant line may perform the indoor heating through the waste heat of the electronic driving unit so that the circulating refrigerant is compressed by the compressor, condensed by the indoor condenser, expanded by the expansion valve at the upstream point of the chiller control valve, and evaporated by the electric chiller.

On the refrigerant line, a frost line may be provided to make the cooling water flowing on the refrigerant line bypass the external heat exchanger when frost occurs on the external heat exchanger by connecting an inflow side and a discharge side of the external heat exchanger with each other.

According to the integrated thermal management circuit for a vehicle of the present disclosure, the electric chiller and the battery chiller are connected in parallel to each other to provide the chiller line, and the heating through the heat pump and the battery heating are independently performed in accordance with the thermal management mode of the vehicle through the chiller control valve provided at the top end portion of the chiller line.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
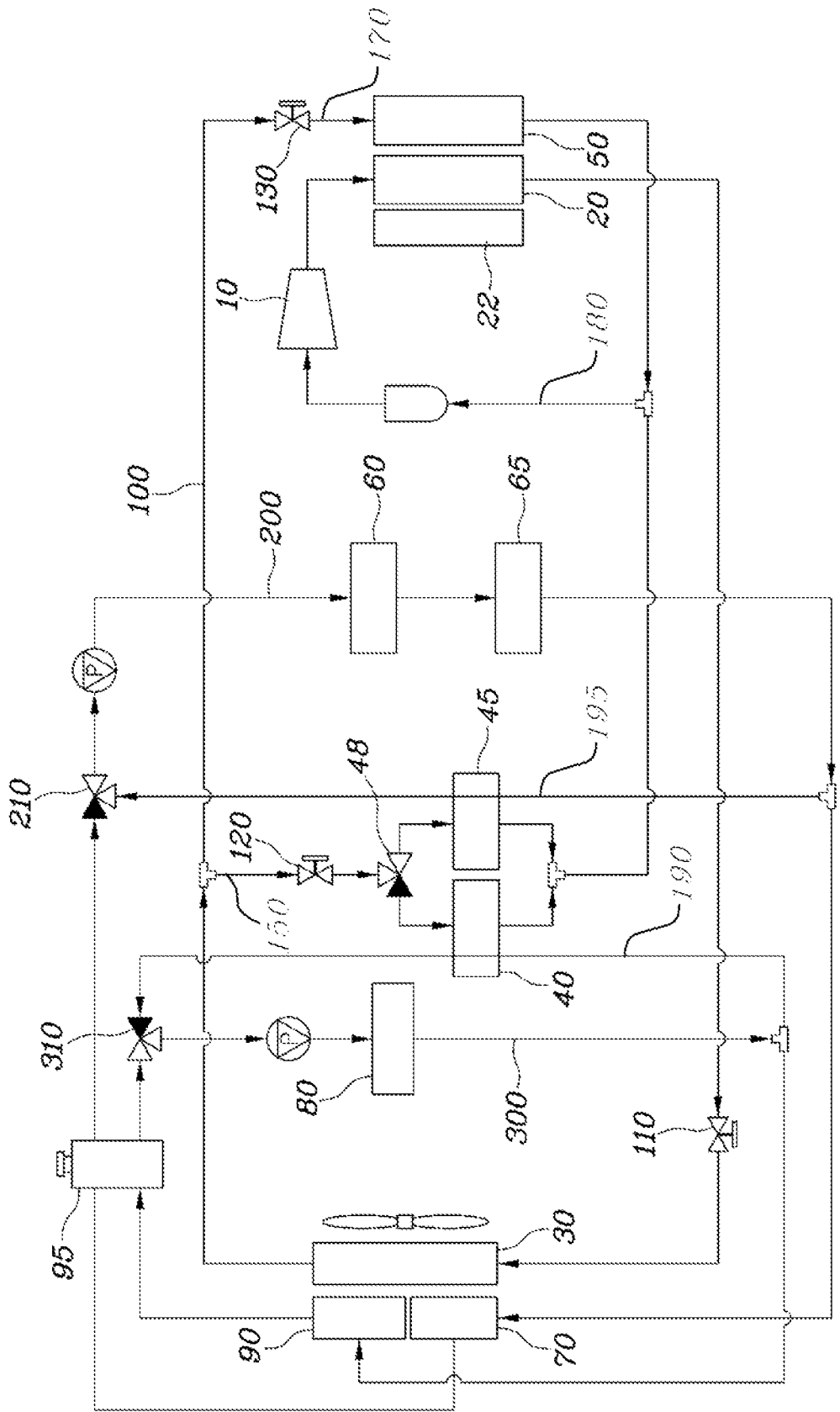
FIG. 1 is a diagram illustrating an integrated thermal management circuit for a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 2:
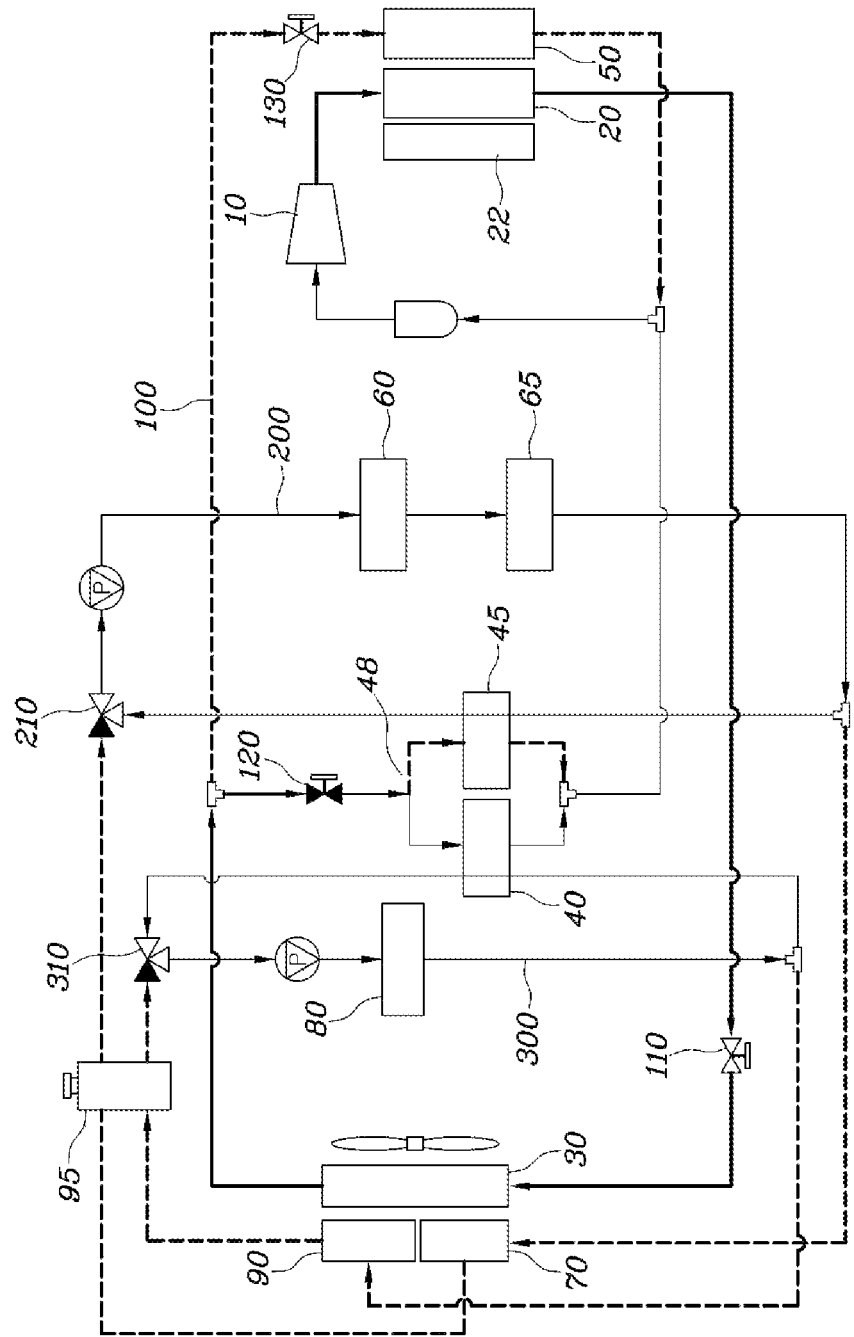
FIG. 2 is a diagram explaining that an electric waste heat recovery mode and an indoor heating and battery heating mode are respectively performed in an integrated thermal management circuit for a vehicle according to an exemplary embodiment of the present disclosure.
Figure 3:
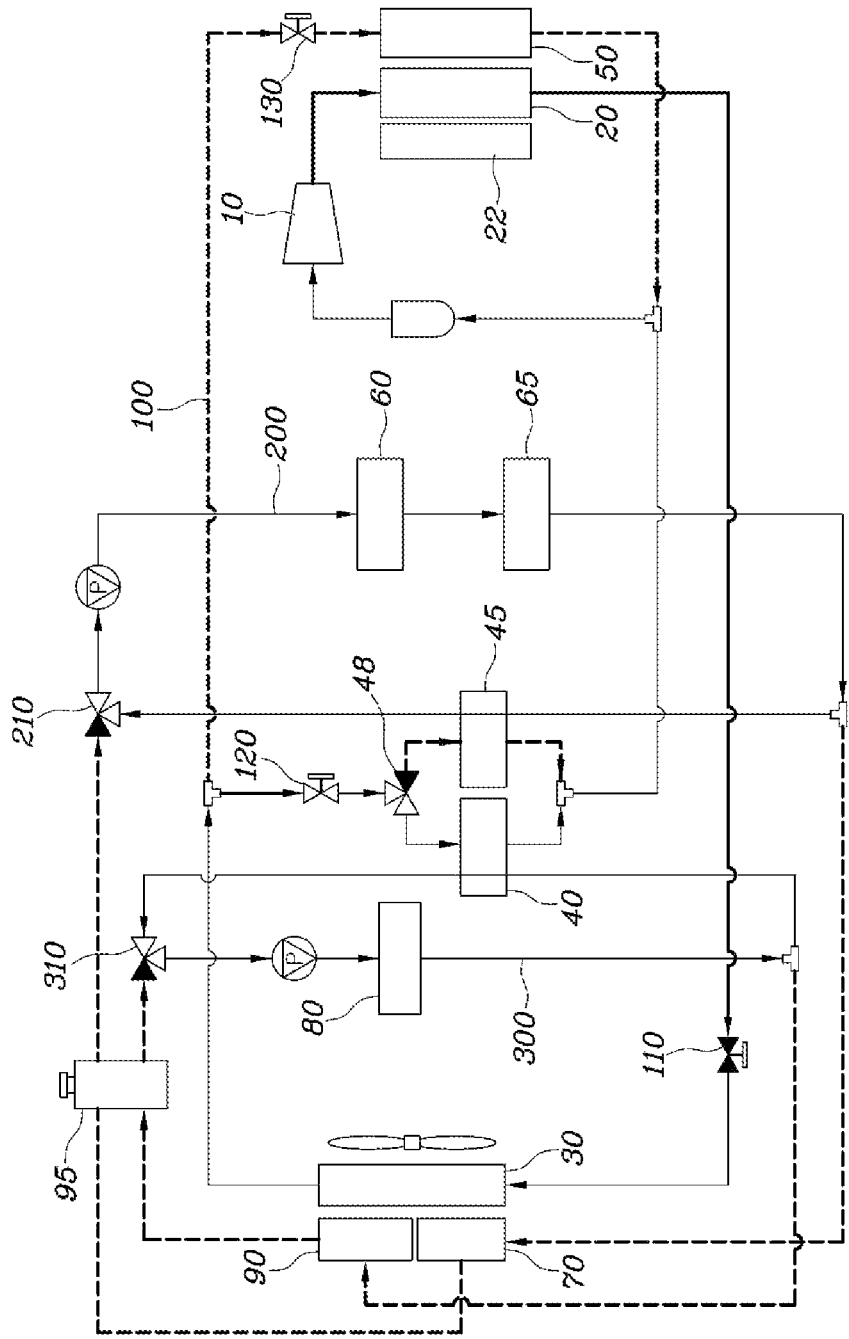
FIG. 3 is a diagram explaining that an external air and electric waste heat recovery mode and an indoor heating and battery heating mode are respectively performed in an integrated thermal management circuit for a vehicle according to an exemplary embodiment of the present disclosure.
Figure 4:
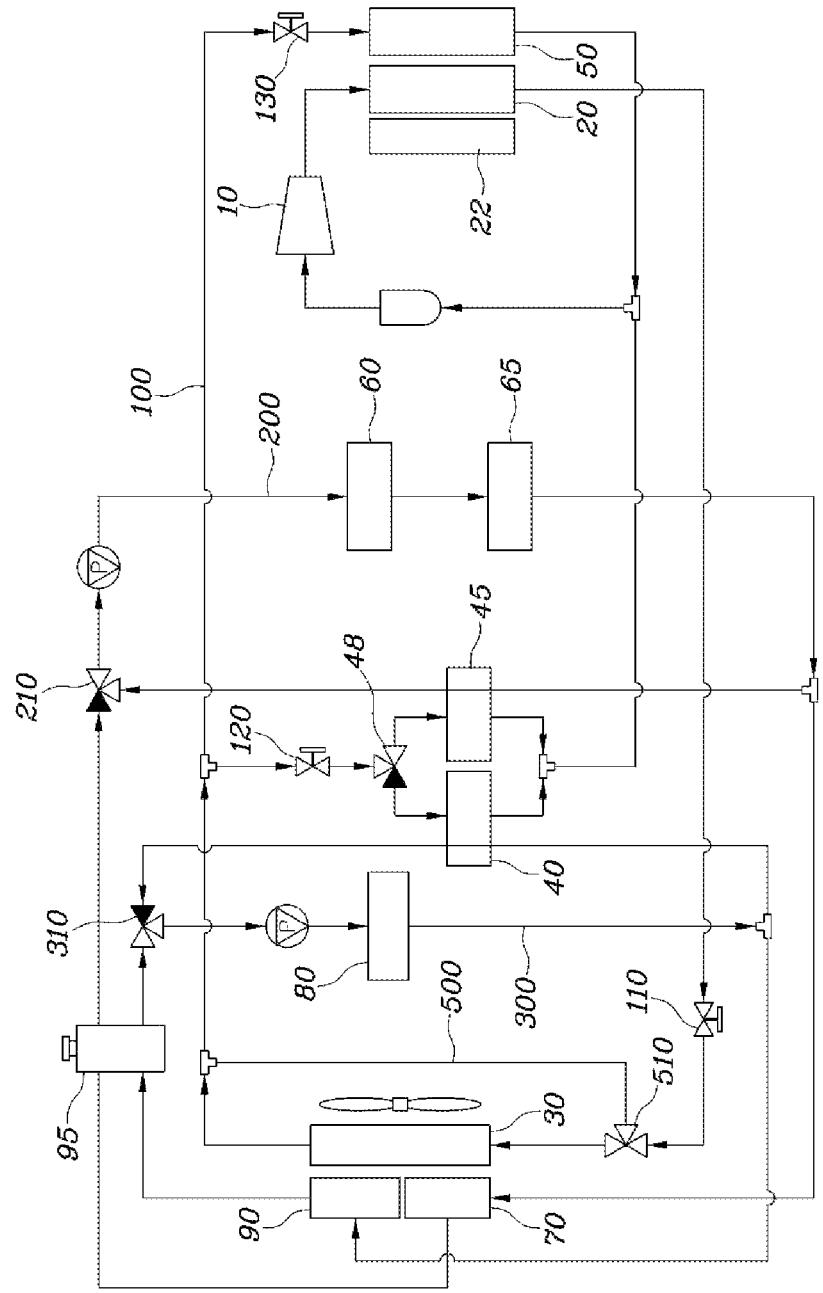
FIG. 4 is a diagram explaining that a frost line is added in an integrated thermal management circuit for a vehicle according to an exemplary embodiment of the present disclosure.
Figure 5:
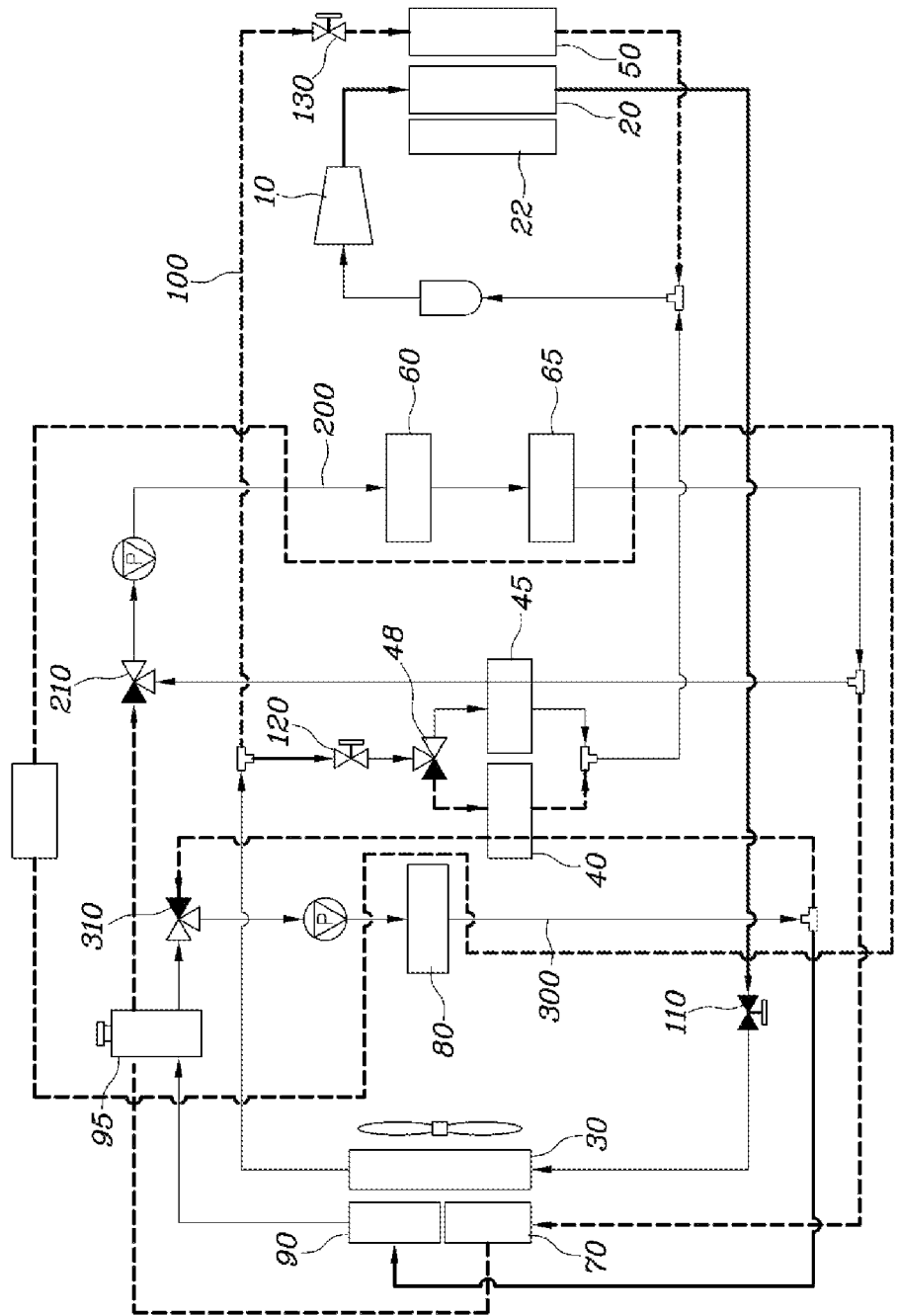
FIG. 5 is a diagram explaining that an electronic driving unit external air cooling and a battery chiller cooling mode are respectively performed in an integrated thermal management circuit for a vehicle according to an exemplary embodiment of the present disclosure.
Figure 6:
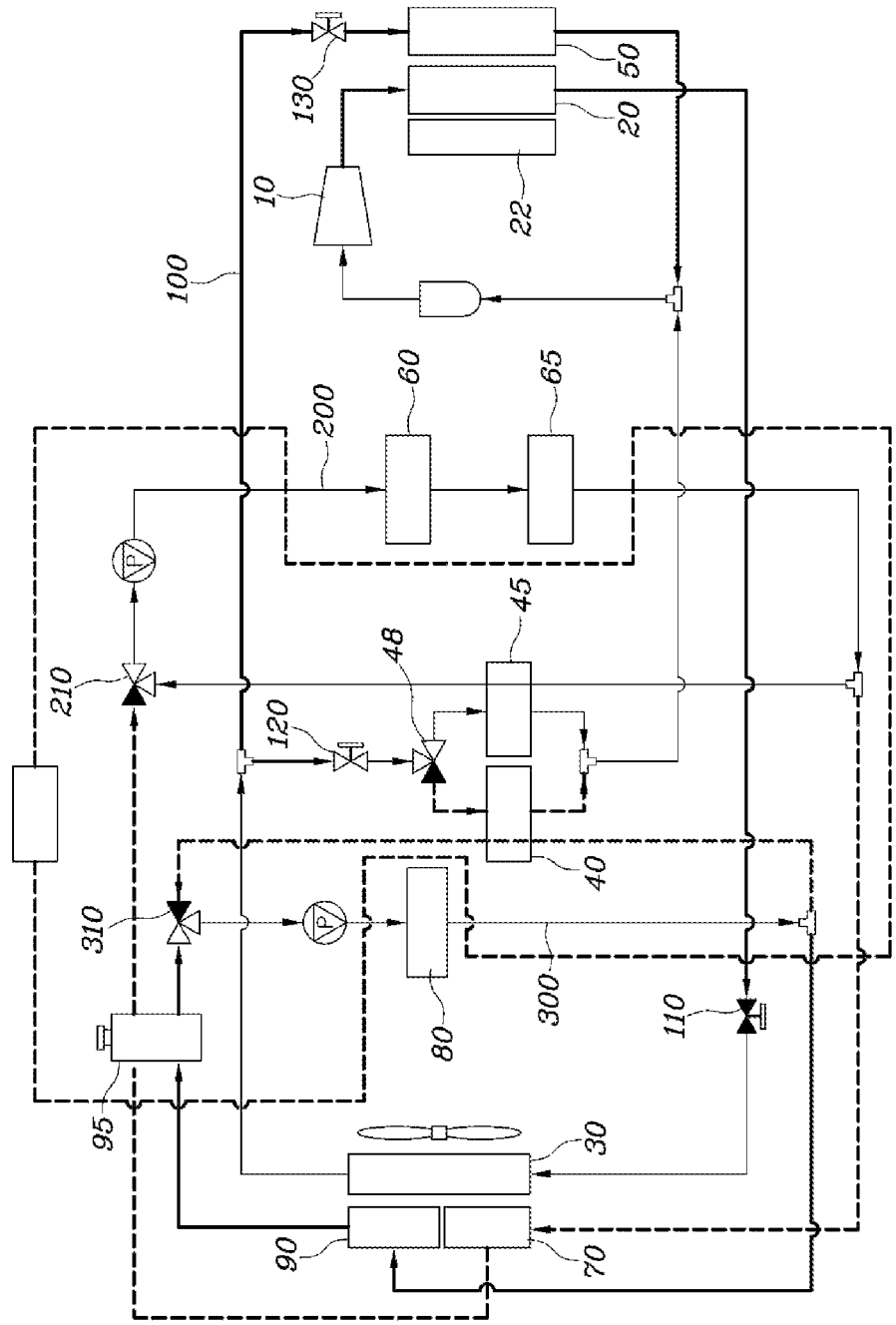
FIG. 6 is a diagram explaining that an electronic driving unit external air cooling, a battery chiller cooling mode, and an indoor cooling mode are respectively performed in an integrated thermal management circuit for a vehicle according to an exemplary embodiment of the present disclosure.
Figure 7:
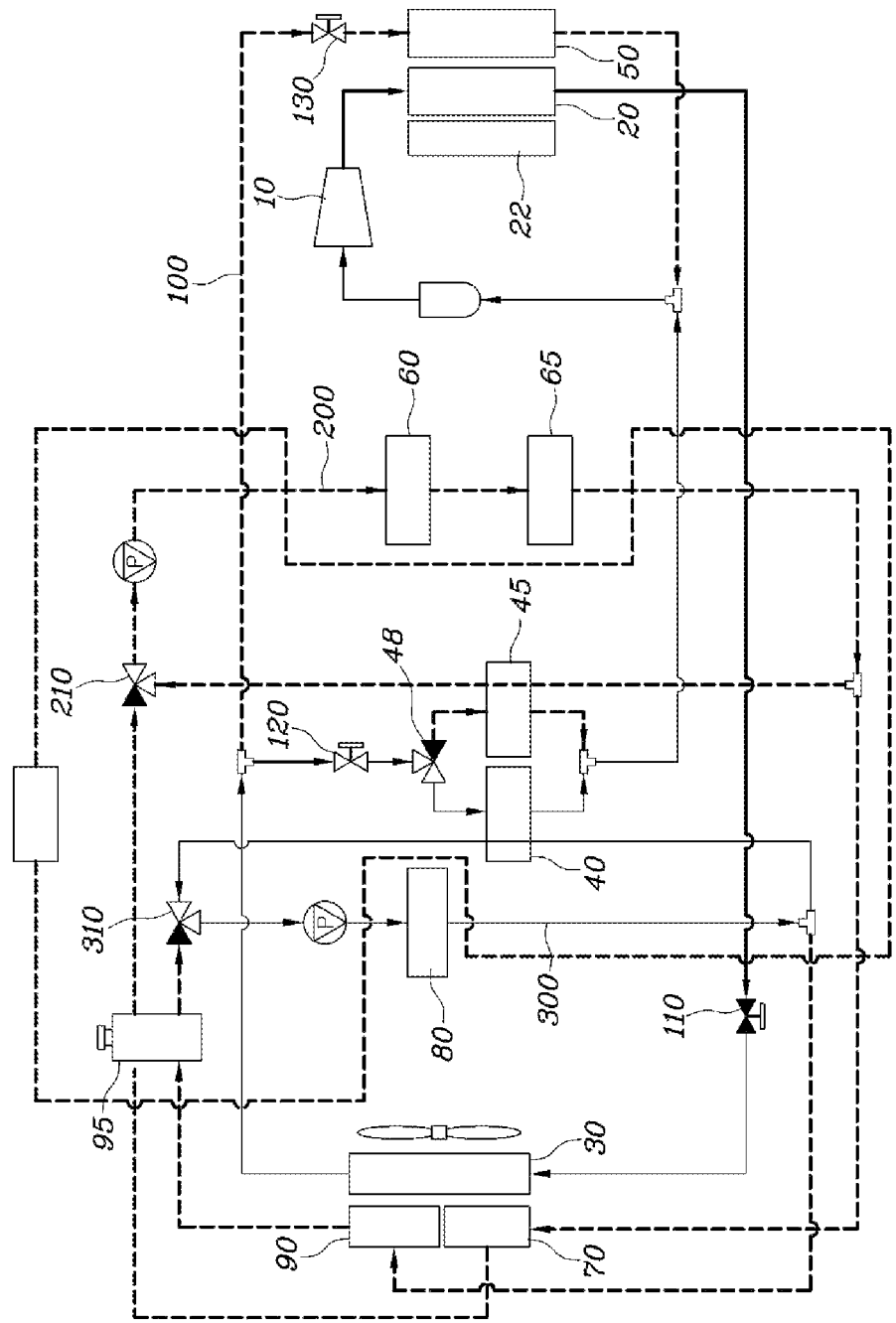
FIG. 7 is a diagram explaining that an indoor heating mode is performed through external air and waste heat recovery in an electronic driving unit in an integrated thermal management circuit for a vehicle according to an exemplary embodiment of the present disclosure.
Figure 8:
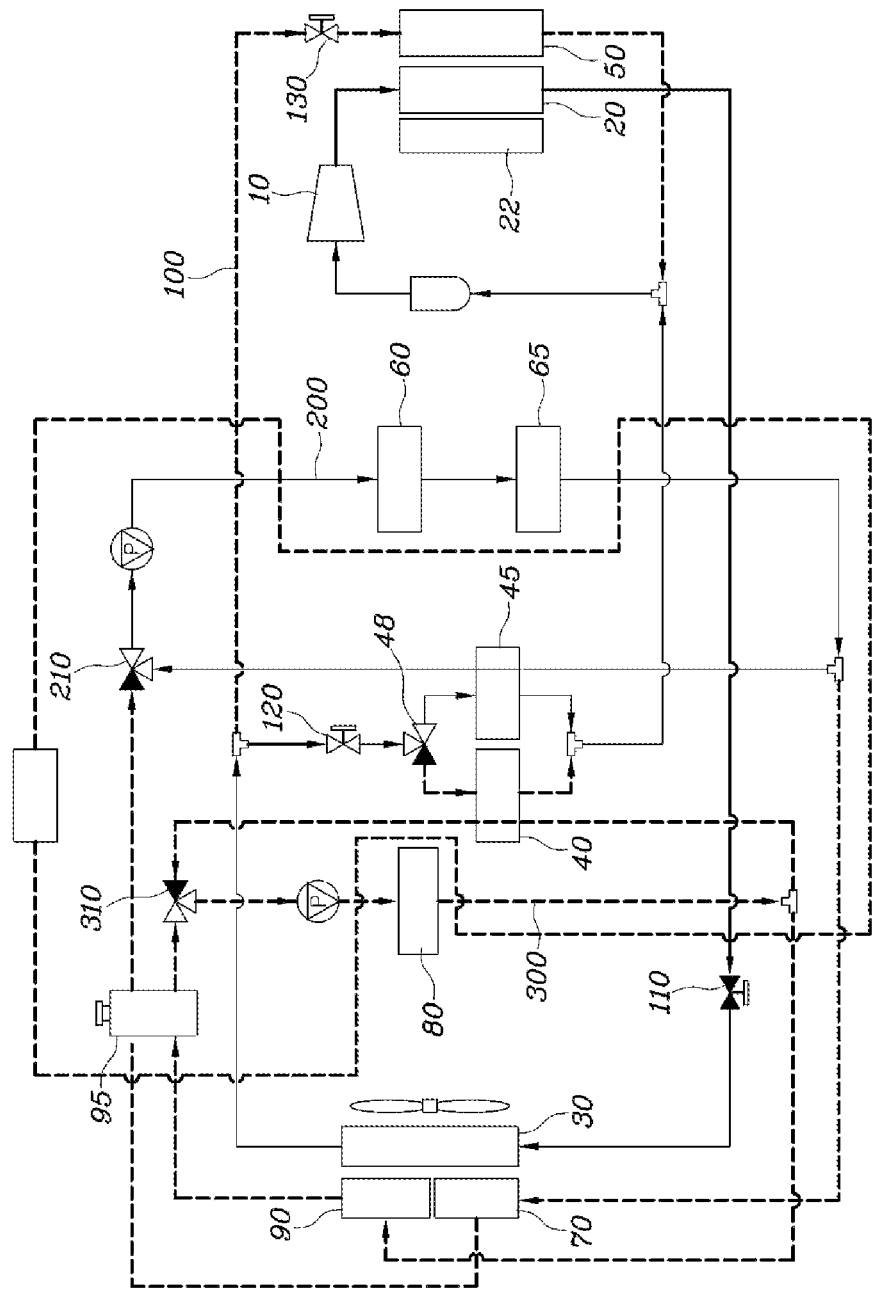
FIG. 8 is a diagram explaining that an indoor heating mode is performed through external air and waste heat recovery in a battery in an integrated thermal management circuit for a vehicle according to an exemplary embodiment of the present disclosure.
Figure 9:
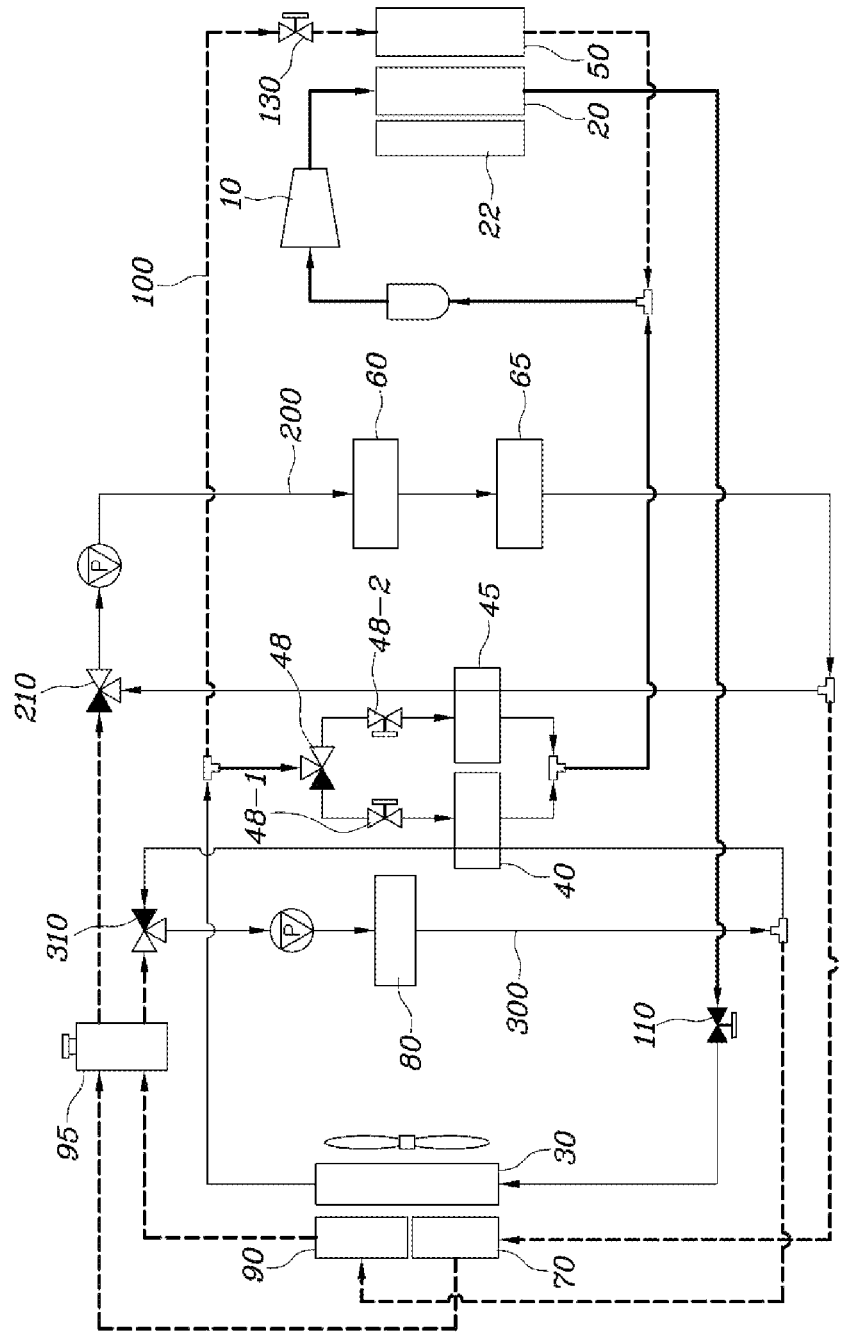
FIG. 9 is a diagram explaining that an expansion valve is provided between an electric chiller and a battery chiller connected in parallel to downstream of a chiller control valve in an integrated thermal management circuit for a vehicle according to an exemplary embodiment of the present disclosure.

FIG. 1 is a diagram illustrating an integrated thermal management circuit for a vehicle according to an exemplary embodiment of the present disclosure. FIG. 2 is a diagram explaining that an electric waste heat recovery mode and an indoor heating and battery heating mode are respectively performed in an integrated thermal management circuit for a vehicle according to an exemplary embodiment of the present disclosure. FIG. 3 is a diagram explaining that an external air and electric waste heat recovery mode and an indoor heating and battery heating mode are respectively performed in an integrated thermal management circuit for a vehicle according to an exemplary embodiment of the present disclosure. FIG. 4 is a diagram explaining that a frost line is added in an integrated thermal management circuit for a vehicle according to an exemplary embodiment of the present disclosure. FIG. 5 is a diagram explaining that an electronic driving unit external air cooling and a battery chiller cooling mode are respectively performed in an integrated thermal management circuit for a vehicle according to an exemplary embodiment of the present disclosure. FIG. 6 is a diagram explaining that an electronic driving unit external air cooling, a battery chiller cooling mode, and an indoor cooling mode are respectively performed in an integrated thermal management circuit for a vehicle according to an exemplary embodiment of the present disclosure. FIG. 7 is a diagram explaining that an indoor heating mode through waste heat recovery is performed through external air and an electronic driving unit in an integrated thermal management circuit for a vehicle according to an exemplary embodiment of the present disclosure. FIG. 8 is a diagram explaining that an indoor heating mode through waste heat recovery is performed through external air and a battery in an integrated thermal management circuit for a vehicle according to an exemplary embodiment of the present disclosure. FIG. 9 is a diagram explaining that an expansion valve is provided between an electric chiller and a battery chiller connected in parallel to downstream of a chiller control valve in an integrated thermal management circuit for a vehicle according to an exemplary embodiment of the present disclosure.

FIG. 1 is a diagram illustrating an integrated thermal management circuit for a vehicle according to an exemplary embodiment of the present disclosure. The integrated thermal management circuit for a vehicle according to an exemplary embodiment of the present disclosure includes: a refrigerant line 100 on which a refrigerant flows in an order of a compressor 10, an indoor condenser 20 of an indoor air conditioning device, and an external heat exchanger 30, the refrigerant discharged from the external heat exchanger 30 is branched and flows into a chiller line 150 and an evaporation line 170, an electric chiller 40 and a battery chiller 45 are connected in parallel on the chiller line 150, and the refrigerants having passed through the chiller line 150 and the evaporation line 170 join each other to flow into the compressor 10 through a first bypass line 180; a battery cooling line 200 making a cooling water circulate between a battery 60 and a battery radiator 70 or between the battery 60 and the battery chiller 45; an electric cooling line 300 making the cooling water circulate between an electronic driving unit 80 and an electric radiator 90 or between the electronic driving unit 80 and the electric chiller 40; and a chiller control valve 48 provided at an upstream point of the electric chiller 40 and the battery chiller 45 on the refrigerant line 100, and making the refrigerant discharged from the external heat exchanger 30 flow into the electric chiller 40 or the battery chiller 45.

On the chiller line 150 of the integrated thermal management circuit for a vehicle according to an exemplary embodiment of the present disclosure, the electric chiller 40 and the battery chiller 45 may be formed in unity, and a blocking partition wall blocking heat exchange is provided between the electric chiller 40 and the battery chiller 45.

Furthermore, in the integrated thermal management circuit for a vehicle according to an exemplary embodiment of the present disclosure, the refrigerant of the refrigerant line 100, being heated by the battery chiller 45, the electric chiller 40, or the evaporator 50, may be compressed by the compressor 10, and may be cooled as sequentially passing through the indoor condenser 20 and the external heat exchanger 30.

In case of performing heating of the battery through a water heater 65 in the thermal management circuit in the related art provided with an integrated chiller in which the electric chiller and the battery chiller are integrated, heating through a heat pump using the waste heat of the electronic driving unit 85 is unable to be performed, and in the instant case, there is a problem in that the indoor heating should depend on a PTC heater 22 having a very low efficiency.

Accordingly, in the integrated thermal management circuit for a vehicle according to an exemplary embodiment of the present disclosure, the electric chiller 40 and the battery chiller 45 may be separately provided as separate parts, or may be configured as one united part having respective flow paths. In case that the electric chiller 40 and the battery chiller 45 are configured as one united part, the blocking partition wall is provided between the electric chiller 40 and the battery chiller 45 to block the mutual heat exchange, and various thermal management modes can be independently performed by controlling the refrigerant flow from the upstream of the electric chiller 40 and the battery chiller 45 to the respective chillers through the chiller control valve 48.

That is, the electric chiller 40 and the battery chiller 45 are connected to the electric cooling line 300 and the battery cooling line 200 in a state where the refrigerant flow thereof is controlled through the chiller control valve 48, and thus in case of performing the battery heating mode through the battery cooling line 200, the refrigerant flow to the battery chiller 45 may be blocked, and the indoor heating through a heat pump using the waste heat of the electronic driving unit 80 may be independently performed on the electronic cooling line 300 and the refrigerant line 100.

In the integrated thermal management circuit for a vehicle according to an exemplary embodiment of the present disclosure, the water heater 65 may be provided at a downstream point of the battery 60 on the battery cooling line 200, and the cooling water having passed through the water heater 65 on the battery cooling line 200 may flow into the battery 60 after passing through the battery radiator 70 or the battery chiller 45.

Furthermore, in the integrated thermal management circuit for a vehicle according to an exemplary embodiment of the present disclosure, the battery cooling line 200 may operate the water heater 65 in a battery heating mode, and the cooling water heated through the water heater 65 may flow into the battery 60 to heat the battery after passing through the battery chiller 45.

Meanwhile, in the integrated thermal management circuit for a vehicle according to an exemplary embodiment of the present disclosure, the chiller control valve 48 may open or close a port on the side of the electric chiller 40 or a port on the side of the battery chiller 45 in accordance with a thermal management mode of the vehicle, and may block the port on the side of the battery chiller 45 to prevent the refrigerant from flowing into the battery chiller 45 in the battery heating mode.

FIG. 2 is a diagram explaining that an electric waste heat recovery mode and an indoor heating and battery heating mode are respectively performed in an integrated thermal management circuit for a vehicle according to an exemplary embodiment of the present disclosure. FIG. 3 is a diagram explaining that an external air and electric waste heat recovery mode and an indoor heating and battery heating mode are respectively performed in an integrated thermal management circuit for a vehicle according to an exemplary embodiment of the present disclosure. In the integrated thermal management circuit for a vehicle according to an exemplary embodiment of the present disclosure, a first control valve 210 may be provided at a point where downstream of the battery radiator 70 and the battery chiller 45 and upstream of the battery 60 join each other on the battery cooling line 200, and the first control valve 210 may adjust a flow of the cooling water flowing into the battery 60 by opening or closing the port on the side of the battery radiator 70 or the port on the side of the battery chiller 45 in the third bypass line 195 in accordance with the thermal management mode of the battery 60.

In the integrated thermal management circuit for a vehicle according to an exemplary embodiment of the present disclosure, the first control valve 210 may be a three-way valve, which blocks the port on the side of the battery chiller 45 in an external air cooling mode of the battery 60, and blocks the port on the side of the battery radiator 70 in the chiller cooling mode or heating mode of the battery 60.

Furthermore, in the integrated thermal management circuit for a vehicle according to an exemplary embodiment of the present disclosure, a second control valve 310 may be provided at a point where downstream of the electric radiator 90 and the electric chiller 40 and upstream of the electronic driving unit 80 join each other on the electric cooling line 300, and the second control valve 310 may adjust a flow of the cooling water flowing into the electronic driving unit 80 by opening or closing a port on the side of the electric radiator 90 in the electric cooling line 300 or a port on the side of the electric chiller 40 in a second bypass line 190 in accordance with the thermal management mode of the electronic driving unit 80.

In the integrated thermal management circuit for a vehicle according to an exemplary embodiment of the present disclosure, the second control valve 310 may be a three-way valve, which blocks the port on the side of the electric chiller 40 in the external air cooling mode of the electronic driving unit 80, and blocks the port on the side of the electric radiator 90 in the electric waste heat recovery mode of the electronic driving unit 80.

Meanwhile, in the integrated thermal management circuit for a vehicle according to an exemplary embodiment of the present disclosure, an expansion valve may be provided at an upstream point of the external heat exchanger 30, an upstream point of the chiller line 150, or an upstream point of the evaporation line 170 on the refrigerant line 100, and the refrigerant passing through the expansion valve at the upstream point of the external heat exchanger 30, the upstream point of the chiller line 150, or the upstream point of the evaporation line 170 may be selectively expanded in accordance with the air conditioning mode of the vehicle.

Furthermore, in the integrated thermal management circuit for a vehicle according to an exemplary embodiment of the present disclosure, when the battery cooling line 200 performs the battery heating mode, the electric cooling line 300 may perform the electric waste heat recovery mode of the electronic driving unit 80, and the refrigerant line 100 may perform the indoor heating through the waste heat of the electronic driving unit 80.

In the integrated thermal management circuit for a vehicle according to an exemplary embodiment of the present disclosure, an expansion valve may be provided at the upstream point of the chiller control valve 48, and the refrigerant line 100 may perform the indoor heating through the waste heat of the electronic driving unit 80 so that the circulating refrigerant is compressed by the compressor 10, condensed by the indoor condenser 20, expanded by the expansion valve at the upstream point of the chiller control valve 48, and evaporated by the electric chiller 40.

In conclusion, through the control of the first control valve 210 and the second control valve 110 provided on the downstream of the electric chiller 40 and the battery chiller 45 in addition to the chiller control valve 48, various operating modes, such as electric external air cooling, electric waste heat recovery, battery external air cooling, battery chiller cooling, and dehumidification, in addition to the battery heating mode and the indoor heating through the heat pump may be independently implemented, and the thermal management efficiency of the vehicle can also be heightened.

FIG. 4 is a diagram explaining that a frost line is added in an integrated thermal management circuit for a vehicle according to an exemplary embodiment of the present disclosure. On the refrigerant line 100 of the integrated thermal management circuit for a vehicle according to an exemplary embodiment of the present disclosure, a frost line 500 may be provided to make the cooling water flowing on the refrigerant line 100 bypass the external heat exchanger 30 when frost occurs on the external heat exchanger 30 by connecting an inflow side and a discharge side of the external heat exchanger 30 with each other by operating a third control valve 510 mounted in the refrigerant line 100 at the inflow side of the external heat exchanger 30. When the frost occurs on the external heat exchanger 30, the refrigerant flows into the frost line 500, but does not flow into the external heat exchanger 30. As needed, the refrigerant may be expanded in any one of expansion valves 110 and 120 provided at a front end portion of the external heat exchanger 30 and at a front end portion of the chiller control valve 48 on the refrigerant line 100, and even when the frost occurs on the external heat exchanger 30, various thermal management modes may be implemented without any problem.

FIG. 5 is a diagram explaining that an electronic driving unit external air cooling and a battery chiller cooling mode are respectively performed in an integrated thermal management circuit for a vehicle according to an exemplary embodiment of the present disclosure. FIG. 6 is a diagram explaining that an electronic driving unit external air cooling, a battery chiller cooling mode, and an indoor cooling mode are respectively performed in an integrated thermal management circuit for a vehicle according to an exemplary embodiment of the present disclosure. FIG. 7 is a diagram explaining that an indoor heating mode is performed through external air and waste heat recovery in an electronic driving unit in an integrated thermal management circuit for a vehicle according to an exemplary embodiment of the present disclosure. FIG. 8 is a diagram explaining that an indoor heating mode is performed through external air and waste heat recovery in a battery in an integrated thermal management circuit for a vehicle according to an exemplary embodiment of the present disclosure.

That is, the integrated thermal management circuit for a vehicle according to an exemplary embodiment of the present disclosure has the advantage that various modes, such as battery heating, cooling of the electronic driving unit and the battery, indoor cooling, and indoor heating through the waste heat recovery as described above, may be easily implemented, and high thermal efficiency may be secured.

Meanwhile, FIG. 9 is a diagram explaining that an expansion valve is provided between an electric chiller and a battery chiller connected in parallel to downstream of a chiller control valve in an integrated thermal management circuit for a vehicle according to an exemplary embodiment of the present disclosure. Referring to FIG. 1 and FIG. 9, as for the expansion valves provided on the upstream of the electric chiller and the battery chiller, one expansion valve may be provided on the upstream of the chiller control valve 48, or two expansion valves may be provided on the upstream of the electric chiller and the battery chiller, being branched on the downstream of the chiller control valve 48, so that as needed, the same vehicle thermal management modes may be implemented through configuration of circuits.

In various exemplary embodiments of the present disclosure, a controller is connected to at least one of the elements of integrated thermal management circuit to control the operations thereof.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An integrated thermal management circuit for a vehicle, the circuit comprising:
 a refrigerant line on which a refrigerant flows in an order of a compressor, an indoor condenser of an indoor air conditioning device, and an external heat exchanger, wherein the refrigerant discharged from the external heat exchanger is branched and flows into a chiller line and an evaporation line, an electric chiller and a battery chiller are connected in parallel on the chiller line, and the refrigerants having passed through the chiller line and the evaporation line join each other to flow into the compressor through a first bypass line of the refrigerant line;
 a battery cooling line making a cooling water circulate between a battery and a battery radiator or between the battery and the battery chiller;

an electric cooling line making the cooling water circulate between an electronic driving unit and an electric radiator or between the electronic driving unit and the electric chiller; and a chiller control valve provided at an upstream point of the electric chiller and the battery chiller on the chiller line, and making the refrigerant discharged from the external heat exchanger flow into the electric chiller or the battery chiller.

2. The circuit of claim 1, wherein on the chiller line, the electric chiller and the battery chiller are formed in unity, and a blocking partition wall blocking heat exchange is provided between the electric chiller and the battery chiller.

3. The circuit of claim 1, wherein the refrigerant of the refrigerant line, being heated by the battery chiller, the electric chiller, or the evaporator, is compressed by the compressor, and is cooled as sequentially passing through the indoor condenser and the external heat exchanger.

4. The circuit of claim 1, wherein a water heater is provided at a downstream point of the battery on the battery cooling line, and the cooling water having passed through the water heater on the battery cooling line flows into the battery after passing through the battery radiator or the battery chiller.

5. The circuit of claim 4, wherein the water heater is operated in the battery cooling line in a battery heating mode, and the cooling water heated through the water heater flows into the battery to heat the battery after passing through the battery chiller.

6. The circuit of claim 1, wherein the chiller control valve is configured to open or close an electric chiller side port thereof or a battery chiller side port thereof in accordance with a thermal management mode of the vehicle, and to block the battery chiller side port to prevent the refrigerant from flowing into the battery chiller in a battery heating mode.

7. The circuit of claim 1, wherein a first control valve is provided at a point where downstream of the battery radiator and the battery chiller and upstream of the battery join each other on the battery cooling line, and the first control valve is configured to adjust a flow of the cooling water flowing into the battery by opening or closing a battery radiator side port or a battery chiller side port thereof in a third bypass line in accordance with a thermal management mode of the battery.

8. The circuit of claim 7, wherein the third bypass line is connected to the first control valve, the battery chiller and the battery radiator.

9. The circuit of claim 7, wherein the first control valve is a three-way valve configured to block the battery chiller side port in an external air cooling mode of the battery, and to block the battery radiator side port in a chiller cooling mode or a heating mode of the battery.

10. The circuit of claim 1, wherein a second control valve is provided at a point where downstream of the electric radiator and the electric chiller and upstream of the electronic driving unit join each other on the electric cooling line, and the second control valve is configured to adjust a flow of the cooling water flowing into the electronic driving unit by opening or closing an electric radiator side port in the electric cooling line or an electric chiller side port thereof in a second bypass line in accordance with a thermal management mode of the electronic driving unit.

11. The circuit of claim 10, wherein the second control valve is a three-way valve configured to block the electric chiller side port in an external air cooling mode of the electronic driving unit, and to block the electric radiator side port in an electric waste heat recovery mode of the electronic driving unit.

12. The circuit of claim 10, wherein the second bypass line is connected to the second control valve, the electric chiller, an end portion of the electric cooling line in bypassing the electric driving unit, and the electric radiator.

13. The circuit of claim 1, wherein an expansion valve is provided at an upstream point of the external heat exchanger, an upstream point of the chiller line, or an upstream point of the evaporation line of the refrigerant line, and the refrigerant passing through the expansion valve at the upstream point of the external heat exchanger, the upstream point of the chiller line, or the upstream point of the evaporation line is selectively expanded in accordance with an air conditioning mode of the vehicle.

14. The circuit of claim 1, wherein when the battery cooling line performs a battery heating mode, the electric cooling line performs an electric waste heat recovery mode of the electronic driving unit, and the refrigerant line performs indoor heating through waste heat of the electronic driving unit.

15. The circuit of claim 14, wherein an expansion valve is provided at an upstream point of the chiller control valve, and the refrigerant line performs the indoor heating through the waste heat of the electronic driving unit so that the circulating refrigerant is compressed by the compressor, condensed by the indoor condenser, expanded by the expansion valve at the upstream point of the chiller control valve, and evaporated by the electric chiller.

16. The circuit of claim 1, wherein on the refrigerant line, a frost line is provided to make the cooling water flowing on the refrigerant line bypass the external heat exchanger when frost occurs on the external heat exchanger by connecting an inflow side and a discharge side of the external heat exchanger with each other.

17. The circuit of claim 16, wherein a third control valve connected to the frost line is mounted in the refrigerant line at the inflow side of the external heat exchanger.

18. The circuit of claim 1, wherein the condenser and the indoor condenser are mounted on the first bypass line connected to the external heat exchanger.

* * * * *